(12) United States Patent
Mgbenka et al.

(10) Patent No.: US 11,457,345 B2
(45) Date of Patent: Sep. 27, 2022

(54) SYSTEM AND APPLICATION TO ALERT A THIRD PARTY DURING AN EMERGENCY

(71) Applicants: Ginikachukwu Mgbenka, Bowie, MD (US); Dillion Knight, Bowie, MD (US)

(72) Inventors: Ginikachukwu Mgbenka, Bowie, MD (US); Dillion Knight, Bowie, MD (US)

(*) Notice: Subject to any disclaimer, the term of this patent is extended or adjusted under 35 U.S.C. 154(b) by 299 days.

(21) Appl. No.: 16/907,194

(22) Filed: Jun. 20, 2020

(65) Prior Publication Data

US 2021/0400457 A1    Dec. 23, 2021

(51) Int. Cl.
| | |
|---|---|
| *H04W 4/90* | (2018.01) |
| *G06F 3/16* | (2006.01) |
| *G08B 25/12* | (2006.01) |
| *G06Q 50/26* | (2012.01) |
| *G06Q 50/30* | (2012.01) |
| *B60R 11/02* | (2006.01) |
| *B60R 11/00* | (2006.01) |

(52) U.S. Cl.
CPC .............. *H04W 4/90* (2018.02); *G06F 3/165* (2013.01); *G06Q 50/265* (2013.01); *G08B 25/12* (2013.01); *B60R 11/0241* (2013.01); *B60R 2011/001* (2013.01); *G06Q 50/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0082651 A1* | 4/2007 | Loizeaux | .......... | H04M 1/72424 455/404.1 |
| 2011/0257812 A1* | 10/2011 | Carpenter | ............... | G01S 19/53 235/385 |
| 2014/0187191 A1* | 7/2014 | Mader | ................. | B60R 21/0136 455/404.1 |
| 2016/0335895 A1* | 11/2016 | Lui | ........................ | G08G 1/005 |
| 2019/0318609 A1* | 10/2019 | Obayuwana | ............. | B60Q 1/50 |

* cited by examiner

*Primary Examiner* — Phung-Hoang J Nguyen
(74) *Attorney, Agent, or Firm* — The Iwashko Law Firm, PLLC; Lev Ivan Gabriel Iwashko

(57) ABSTRACT

A system connected to an external computing device running a program thereon alert a third party during an emergency, the system including a discreet notification device removably disposed on at least a portion of a steering wheel of a vehicle running the program thereon, the discreet notification device including a body, a primary emergency button disposed on at least a portion of the body to transmit an emergency signal to the external computing device to make an emergency call based on determination of at least one of an intentional press and an accidental press of the primary emergency button, and a deactivation button disposed on at least a portion of the body, and a foot notification device disposed on at least a portion of a floor of the vehicle running the program thereon, the foot notification device including another body, and a secondary emergency button removably disposed on at least a portion of the another body to transmit the emergency signal to the external computing device to make the emergency call to at least one third party in response to depressing the secondary emergency button.

16 Claims, 4 Drawing Sheets

SYSTEM AND APPLICATION TO ALERT A THIRD PARTY DURING AN EMERGENCY

BACKGROUND

1. Field

The present general inventive concept relates generally to an application to alert a third party, and particularly, to a system and application to alert a third party during an emergency.

2. Description of the Related Art

Ridesharing is a service provided by a ridesharing company (a.k.a. a transportation network company, ride-hailing) that matches a passenger with a vehicle using a software application (e.g., a mobile app) and/or a website. Ridesharing has become a popular innovation allowing a user (i.e. a potential passenger) to often use a mobile device (e.g., a smartphone) to request a ride. In most cases, at least one driver using the same software application will respond, and thereby accept providing the user transportation to a desired destination of the user. Moreover, the vehicle operated by the driver is usually owned by the driver, and not commercially owned.

Very often, media outlets focus on incidents where passengers commuting via rideshare companies have bad experiences that threaten their safety. As a result, many measures are put into place to enhance security of the passengers.

Conversely, drivers providing rideshare service for the passengers are sometimes overlooked by the media outlets because drivers are not considered victims. However, several media outlets have reported assault occurrences for both drivers and passengers. For example, Uber recently reported approximately the same amount of assault over two years for drivers as did passengers, which numbered approximately three thousand cases each, or a total of six thousand. This reflects the need for placing just as much emphasis on driver safety as is placed on passenger safety.

Currently, the most common solution attempted by drivers that feel threatened is to dial 911 to request emergency assistance, such as police. Unfortunately, this solution presents some problems including: (1) it is not discreet and might instigate an actual physical and/or verbal attack from a potential attacker, (2) unlocking a phone and dialing 911, correctly, while panicking might take longer than usual, and (3) even if the driver successfully dials 911, the driver might be facing a hostile situation from the passenger, such that the driver cannot brief the dispatcher on the situation.

Some ridesharing companies, such as Uber, provide the driver a safety tool kit option within their app, which enables the driver to perform a swipe on the mobile device of the driver to call and/or text 911. However, the disadvantages of the safety tool kit are the same as the problems discussed above.

Another alternative solution is physical confrontation by the driver. Apart from the fact that physical confrontation is a test of strength, speed, agility, and luck, the driver with back seat passengers are put at an immediate disadvantage based on position, as it would be very difficult to maintain control of the vehicle and fight off an attacker seated behind them.

Therefore, there is a need for a system and application to alert a third party during an emergency, such as police and additional people selected by the driver.

SUMMARY

The present general inventive concept provides a system and application to alert a third party during an emergency.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system connected to an external computing device running a program thereon alert a third party during an emergency, the system including a discreet notification device removably disposed on at least a portion of a steering wheel of a vehicle running the program thereon, the discreet notification device including a body, a primary emergency button disposed on at least a portion of the body to transmit an emergency signal to the external computing device to make an emergency call based on determination of at least one of an intentional press and an accidental press of the primary emergency button, and a deactivation button disposed on at least a portion of the body, and a foot notification device disposed on at least a portion of a floor of the vehicle running the program thereon, the foot notification device including another body, and a secondary emergency button removably disposed on at least a portion of the another body to transmit the emergency signal to the external computing device to make the emergency call to at least one third party in response to depressing the secondary emergency button.

The discreet notification device may further include an audio unit disposed on at least a portion of the body to receive at least one sound input therein, and emit at least one other sound therefrom, and an intercom switch springingly disposed on at least a portion of the body to allow sound to be emitted from the audio unit in response to moving to on in a first position, and preventing sound from being emitted from the audio unit in response to moving to off in a second position.

The discreet notification device may further include a pressure sensor disposed within at least a portion of the body to detect at least one of a pressure level and a duration of time depressed on the primary emergency button.

The discreet notification device may further include a control unit disposed within at least a portion of the body to compare the pressure level to a predetermined pressure level and the duration of time depressed to a predetermined duration of time depressed.

The control unit may confirm the intentional press and transmits the emergency signal using the program to the external computing device to make the emergency call to the at least one third party in response to determining the pressure level exceeding the predetermined pressure level and the duration of time depressed exceeds the predetermined duration of time depressed on the primary emergency button.

The control unit may confirm the accidental press and monitors a predetermined countdown.

The control unit may vibrate during the predetermined countdown.

The control unit may prevent transmission of the emergency signal in response to depression of the deactivation button.

The control unit may transmit the emergency signal in response to receiving predetermined consecutive depresses of the primary emergency button.

The control unit may transmit the emergency signal in response to expiration of the predetermined countdown.

The intercom switch may automatically move to off after the emergency call has completed.

At least one of the discreet notification device and the foot notification device may use the program to determine the at least one third party is at least one of at least one first responder and a predetermined number of people from a contact list.

At least one of the discreet notification device and the foot notification device may use the program to determine the predetermined number of people from the contact list are ranked by priority.

At least one of the discreet notification device and the foot notification device may use the program to perform at least one of silence at least one incoming call and transfer the at least one incoming call to voicemail.

At least one of the discreet notification device and the foot notification device may use the program to provide a geographical location to the external computing device.

The discreet notification device may receive at least one vocal input for the program to use a code phrase to transmit the emergency signal to the external computing device to make the emergency call.

The system may further include an attacker deterrent unit removably disposed on at least a portion of a rear passenger area of the vehicle to emit a high-pitched buzzing sound in response to depressing the primary emergency button and the secondary emergency button, such that the high-pitched buzzing sound has a frequency level and a signal-to-noise ratio level intolerable to people.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
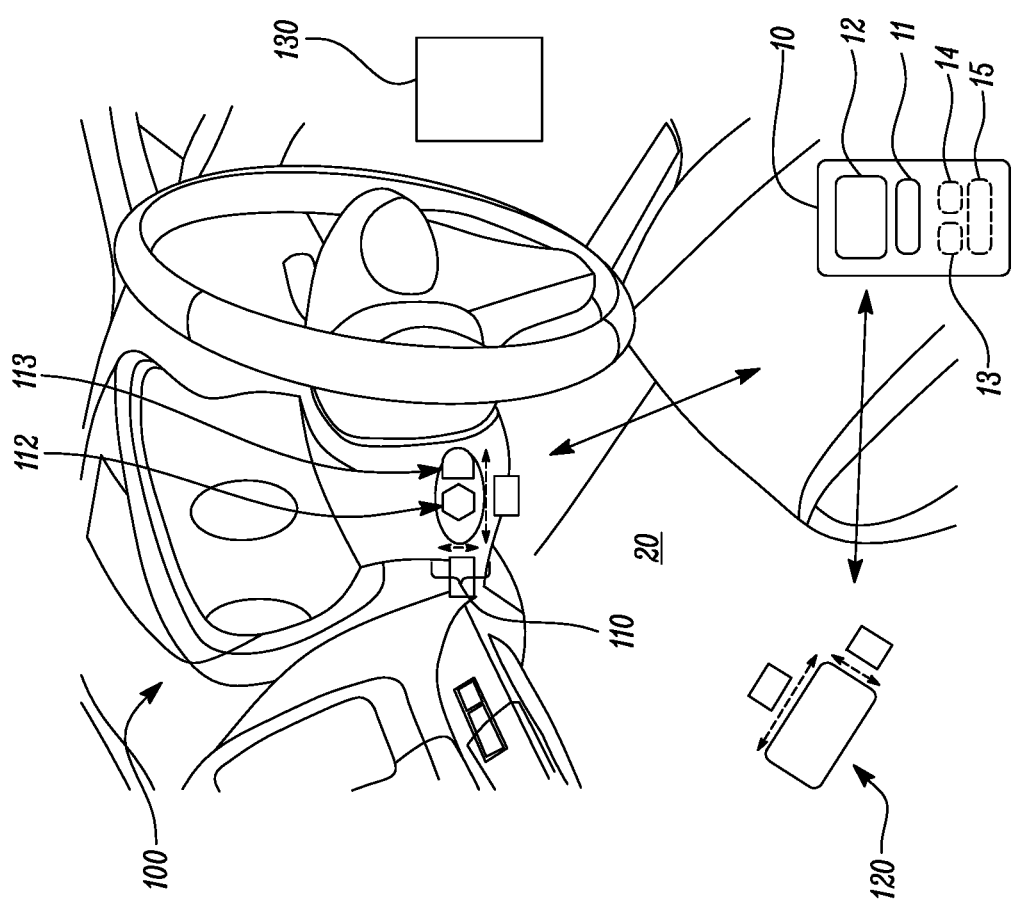
FIG. 1 illustrates a perspective view of a system to alert a third party during an emergency as disposed in a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

System 100
Discreet Notification Device 110
Body 111
Primary Emergency Button 112
Deactivation Button 113
Audio Unit 114
Intercom Switch 115
Pressure Sensor 116
Control Unit 117
Processing Unit 117a
Communication Unit 117b
Storage Unit 117c
Haptic Unit 117d
Power Source 118
Foot Notification Device 120
Body 121
Secondary Emergency Button 122
Control Unit 123
Processing Unit 123a
Communication Unit 123b
Storage Unit 123c
Power Source 124
Attacker Deterrent Unit 130

FIG. 1 illustrates a perspective view of a system 100 to alert a third party during an emergency as disposed in a vehicle 20, according to an exemplary embodiment of the present general inventive concept.

The system 100 may be constructed from at least one of metal, plastic, wood, and rubber, etc., but is not limited thereto.

The system 100 may include a discreet notification device 110, a foot notification device 120, and an attacker deterrent unit 130, but is not limited thereto.

Figure 2:
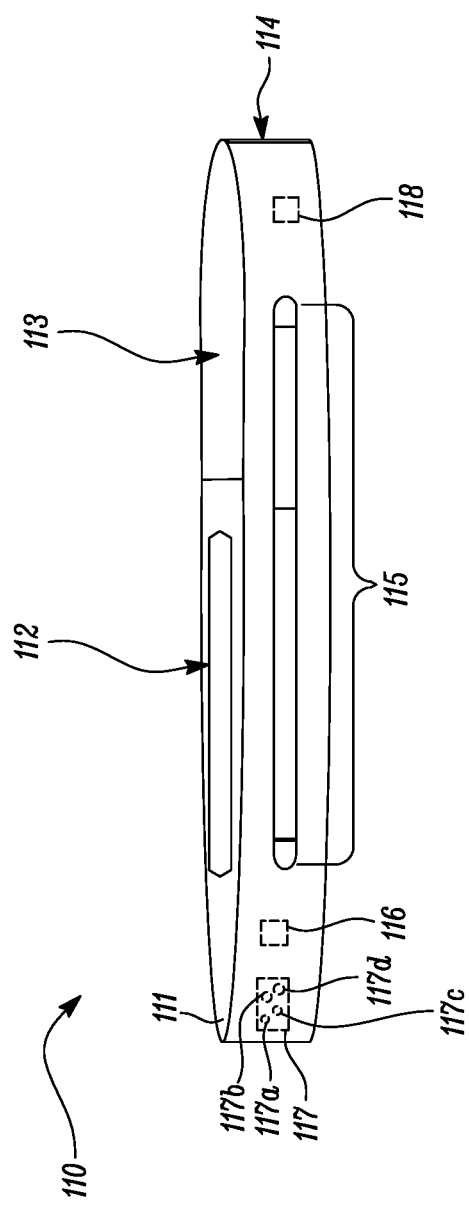
FIG. 2 illustrates a side perspective view of a discreet notification device, according to an exemplary embodiment of the present general inventive concept.

FIG. 2 illustrates a side perspective view of a discreet notification device 110, according to an exemplary embodiment of the present general inventive concept.

The discreet notification device 110 may include a body 111, a primary emergency button 112, a deactivation button 113, an audio unit 114, an intercom switch 115, a pressure sensor 116, a control unit 117, and a power source 118, but is not limited thereto.

Referring to FIG. 2, the body 111 is illustrated to have an oval shape. However, the body 111 may be a rectangular prism shape, circular, conical, triangular, pentagonal, hexagonal, heptagonal, octagonal, or any other shape known to one of ordinary skill in the art, but is not limited thereto. Moreover, the body 111 may have a predetermined shape and/or a predetermined size based on a preference of a user and/or a manufacturer. For example, the body 111 may have a length of four inches, a width of two inches, and a height or depth of one to one and a half inches.

Referring to FIG. 1, the body 111 may be removably disposed on at least a portion of a vehicle 20. For example, the body 111 may be removably disposed on at least a portion of a steering wheel of the vehicle 20. However, the body 111 may be removably disposed anywhere within the vehicle 20 based on the preference of the user and/or the manufacturer.

Referring again to FIG. 2, the primary emergency button 112 is illustrated to have a hexagonal shape and a first color (i.e. red). However, the primary emergency button 112 may be rectangular, circular, conical, triangular, pentagonal, heptagonal, octagonal, or any other shape known to one of ordinary skill in the art, but is not limited thereto. Also, the primary emergency button 112 may have any other color.

Moreover, the hexagonal shape of the primary emergency button 112 may provide an alternative means of recognition of the primary emergency button 112 for at least one colorblind user. In other words, a color of the primary emergency button 112 may be unrecognizable by the user, such that the shape may identify a purpose of the primary emergency button 112.

The primary emergency button 112 may be disposed on at least a portion of a top surface of the body 111. Moreover, the primary emergency button 112 may have a firm (i.e. hard) texture, such that the primary emergency button 112 may remain the same shape in response to being depressed by the user.

Referring again to FIG. 2, the deactivation button 113 is illustrated to have a semioval shape and a second color (i.e. blue). However, the deactivation button 113 may be rectangular, circular, conical, triangular, pentagonal, hexagonal, heptagonal, octagonal, or any other shape known to one of ordinary skill in the art, but is not limited thereto. Also, the deactivation button 113 may have any other color.

Moreover, the semioval shape of the deactivation button 113 may provide another alternative means of recognition of the deactivation button 113 for the at least one colorblind user. In other words, a color of the deactivation button 113 may be unrecognizable by the user, such that the shape may identify a purpose of the deactivation button 113.

As such, the difference in shapes and/or colors between the primary emergency button 112 and/or the deactivation button 113 may facilitate recognition of a purpose and/or function of each button.

The deactivation button 113 may be disposed on at least a portion of the top surface of the body 111. Moreover, the deactivation button 113 may have a soft (i.e. squishy) texture, such that the deactivation button 113 may at least partially deform (i.e. change shape) in response to being depressed by the user.

The audio unit 114 may include a microphone and a speaker, but is not limited thereto.

The audio unit 114 may be disposed on at least a portion of a side surface (e.g., cylindrical surface) of the body 111. The audio unit 114 may receive at least one sound input (i.e. a voice) of the user therein and/or emit at least one other sound (i.e., audio playback) therefrom.

The intercom switch 115 may be springingly disposed (e.g., via a spring) on at least a portion of the side surface of the body 111. The intercom switch 115 may be moved from off in a first position to on in a second position. Also, the intercom switch 115 may be moved from on in the second position to off in the first position.

The pressure sensor 116 may be disposed within at least a portion of the body 111 and may be electrically connected to the primary emergency button 112.

The control unit 117 may include a processing unit 117a, a communication unit 117b, a storage unit 117c, and a haptic unit 117d, but is not limited thereto.

The control unit 117 may be disposed within at least a portion of the body 111. The control unit 117 may interface and/or interact with an external computing device 10. The external computing device 10 may include a mobile phone, a tablet, a laptop computer, a personal digital assistant (PDA), and/or a computer of the vehicle 20. For ease of description, the external computing device 10 will be described as a mobile phone.

The processing unit 117a (or central processing unit, CPU) may include electronic circuitry to carry out instructions of a computer program by performing basic arithmetic, logical, control and input/output (I/O) operations specified by the instructions. The processing unit 117a may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 117a may also include a microprocessor and a microcontroller.

The communication unit 117b may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, global positioning system (GPS) receiver, USB, Firewire, and Ethernet.

The storage unit 117c may include a random access memory (RAM), a read-only memory (ROM), a hard disk, a flash drive, a database connected to the Internet, cloud-based storage, Internet-based storage, or any other type of storage unit.

The haptic unit 117d may include a vibration motor and a pressure dissemination motor.

The power source 118 may include a battery and/or a solar cell, but is not limited thereto. The battery may include lithium-ion, nickel cadmium, nickel metal hydride, alkaline, etc., but is not limited thereto.

The power source 118 may be disposed within at least a portion of the body 111. The power source 118 may provide power to the primary emergency button 112, the deactivation button 113, the audio unit 114, the intercom switch 115, the pressure sensor 116, and the control unit 117, but is not limited thereto.

Figure 3:
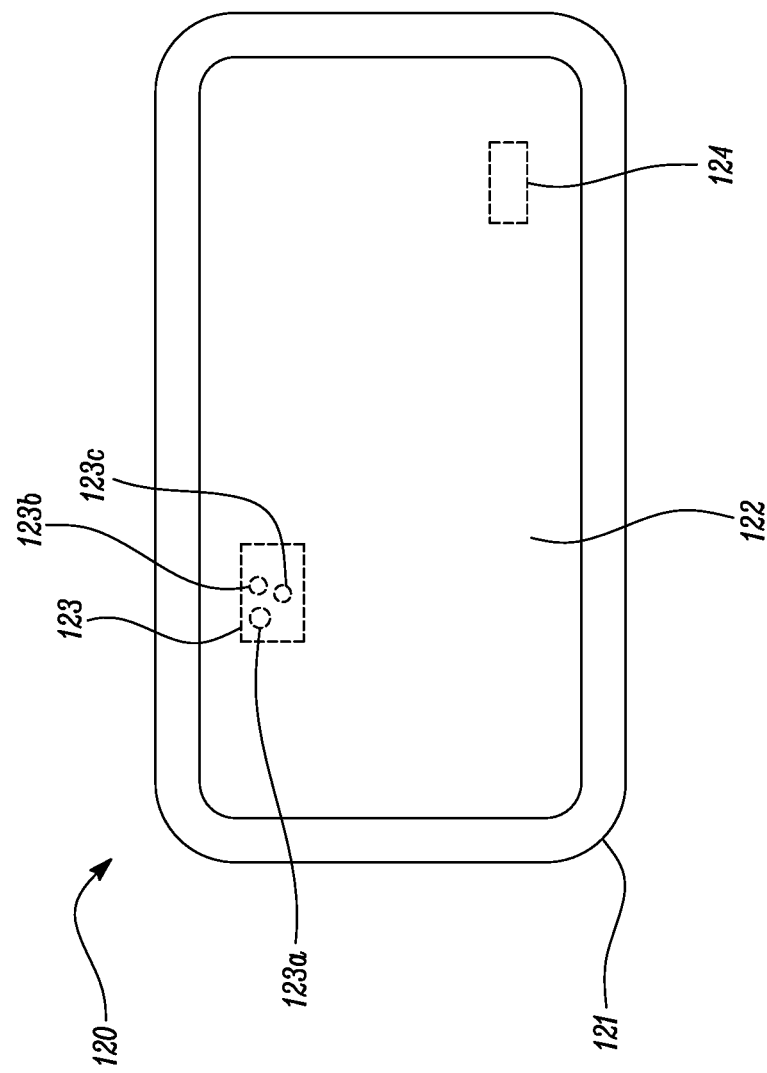
FIG. 3 illustrates a top view of a foot notification device, according to an exemplary embodiment of the present general inventive concept.

FIG. 3 illustrates a top view of a foot notification device 120, according to an exemplary embodiment of the present general inventive concept.

The foot notification device 120 may include a body 121, a secondary emergency button 122, a control unit 123, and a power source 124, but is not limited thereto.

Referring to FIG. 3, the body 121 is illustrated to have a rounded rectangular shape. However, the body 121 may be rectangular, circular, conical, triangular, pentagonal, hexagonal, heptagonal, octagonal, or any other shape known to one of ordinary skill in the art, but is not limited thereto. Moreover, the body 121 may have a predetermined shape and/or a predetermined size based on the preference of the user and/or a manufacturer. For example, the body 121 may have a length of six inches and a width of three inches.

Referring again to FIG. 1, the body 121 may be removably disposed on at least a portion of the vehicle 20. For example, the body 121 may be removably disposed on at least a portion of a floor of the vehicle 20. However, the body 121 may be removably disposed anywhere within the vehicle 20 based on the preference of the user and/or the manufacturer.

Referring again to FIG. 3, the secondary emergency button 122 is illustrated to have a rounded rectangular shape and a red color. However, the deactivation button 113 may be rectangular, circular, conical, triangular, pentagonal, heptagonal, octagonal, or any other shape known to one of ordinary skill in the art, but is not limited thereto. Also, the secondary emergency button 122 may have any other color.

Moreover, the rounded rectangular shape of the secondary emergency button 122 may provide an alternative means of recognition of the secondary emergency button 122 for the at least one colorblind user. In other words, a color of the secondary emergency button 122 may be unrecognizable by the user, such that the shape may identify a purpose of the secondary emergency button 122.

The secondary emergency button 122 may be disposed on at least a portion of a top surface of the body 121.

The control unit 123 may include a processing unit 123a, a communication unit 123b, and a storage unit 123c, but is not limited thereto.

The control unit 123 may be disposed within at least a portion of the body 123. The control unit 123 may interface and/or interact with the external computing device 10.

The processing unit 123a (or central processing unit, CPU) may include electronic circuitry to carry out instructions of a computer program by performing basic arithmetic, logical, control and input/output (I/O) operations specified by the instructions. The processing unit 123a may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 123a may also include a microprocessor and a microcontroller.

The communication unit 123b may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, global positioning system (GPS) receiver, USB, Firewire, and Ethernet.

The storage unit 123c may include a random access memory (RAM), a read-only memory (ROM), a hard disk, a flash drive, a database connected to the Internet, cloud-based storage, Internet-based storage, or any other type of storage unit.

The power source 124 may include a battery and/or a solar cell, but is not limited thereto. The battery may include lithium-ion, nickel cadmium, nickel metal hydride, alkaline, etc., but is not limited thereto.

The power source 124 may be disposed within at least a portion of the body 121. The power source 124 may provide power to the secondary emergency button 122 and the control unit 123, but is not limited thereto.

The external computing device 10 may include an input unit 11, a display unit 12, a processing unit 13, a communication unit 14, and a storage unit 15, but is not limited thereto.

The input unit 11 may include a keyboard, a touchpad, a mouse, a trackball, a stylus, a voice recognition unit, a visual data reader, a camera, a wireless device reader, and a holographic input unit.

The display unit 12 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 12 may be combined with the input unit 11 to be a touch-screen.

The processing unit 13 (or central processing unit, CPU) may include electronic circuitry to carry out instructions of a computer program by performing basic arithmetic, logical, control and input/output (I/O) operations specified by the instructions. The processing unit 13 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 13 may also include a microprocessor and a microcontroller.

The communication unit 14 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, global positioning system (GPS) receiver, USB, Firewire, and Ethernet.

The storage unit 15 may include a random access memory (RAM), a read-only memory (ROM), a hard disk, a flash drive, a database connected to the Internet, cloud-based storage, Internet-based storage, or any other type of storage unit.

Prior to operation of the system 100, the external computing device 10 may access the Internet via the communication unit 14 to allow the user to access a website, and/or may allow the mobile and/or the software application to be executed using the processing unit 13. For ease of description, the mobile and/or the software application will be hereinafter referred to as an app. The app may be downloaded from the Internet to be stored on the storage unit 15.

The external computing device 10 may use the app to make an emergency call and/or send an emergency text (i.e. dial) to 911 in response to receiving an emergency signal from the discreet notification device 110 and/or the foot notification device 120, such that a third party including at least one first responder is contacted, such as police, fire rescue, and/or medical rescue. Moreover, the external computing device 10 may use the app to identify and/or record a geographical location based on a position signal received from the communication unit 117b of the discreet notification device 110 and/or the communication unit 123b of the foot notification device 120.

Also, the external computing device 10 may use the app to select additional third parties including a predetermined number of people from a contact list (e.g., friends, family, etc.) to receive a call in response to receiving the emergency signal from the discreet notification device 110 and/or the foot notification device 120. In other words, the user may select via the input unit 11 to communicate with specific people, such as friends and/or family, each time the emergency signal is received. Additionally, the processing unit 13 of the external computing device 10 may use the app to send the geographical location received from the communication unit 117b of the discreet notification device 110 and/or the communication unit 123b of the foot notification device 120 to the predetermined number of people from the contact list.

Furthermore, the input unit 11 may receive input to the app to allow the user to rank the predetermined number of people from the contact list based on priority, such that a highest priority and/or a first priority would be notified first, and a lowest priority and/or a last priority would be notified last.

Additionally, the processing unit 13 may receive instructions from the app to silence at least one incoming call and/or transfer the at least one incoming call to voicemail, such that the display unit 12 of the external computing device 10 does not display and/or identify the at least one incoming call.

The processing unit 13 executing the app may send a copy of the app from the storage unit 15 using the communication unit 14 to the communication unit 117b of the discreet notification device 110 and/or the communication unit 123b of the foot notification device 120. Subsequently, the processing unit 117a of the discreet notification device 110 and/or the processing unit 123a of the foot notification device 120 may direct the copy of the app to the storage unit 117c of the discreet notification device 110 and/or the storage unit 123c of the foot notification device 120 for storage, installation, and/or updating the app thereupon.

Alternatively, and/or in addition to a button press from the discreet notification device 110 and/or the foot notification device 120, the discreet notification device 110 and/or the foot notification device 120 may receive at least one vocal input for the app to use a code phrase to activate the discreet notification device 110 and/or the foot notification device 120. More specifically, the discreet notification device 110 and/or the foot notification device 120 may use the app to receive instructions customized by the user to use the code phrase instead of the primary emergency button 112 and/or the secondary emergency button 122 to activate the respective functions.

Alternatively, the discreet notification device 110 and/or the foot notification device 120 may be preconfigured with the app already installed and/or preconfigured to download the app from the Internet.

During an emergency situation, the user may utilize the discreet notification device 110 and/or the foot notification device 120.

The processing unit 117a may transmit the emergency signal via the communication unit 117b to the communication unit 14 of the external computing device 10 in response to the primary emergency button 112 being depressed. Alternatively, the processing unit 117a may transmit the emergency signal via the communication unit 117b to the communication unit 14 of the external computing device 10 in response to the audio unit 114 receiving the code phrase. The processing unit 117a may monitor a pressure level detected from the pressure sensor 116 and/or a duration of time depressed of the primary emergency button 112 detected from the pressure sensor 116. Moreover, the processing unit 117a may compare the pressure level to a predetermined pressure level and/or the duration of time depressed to a predetermined duration of time depressed to determine whether both criteria are met. As such, the processing unit 117a may confirm an intentional press in response to the pressure level exceeding the predetermined pressure level and/or the duration of time depressed exceeding the predetermined duration of time depressed.

In event of an accidental press (i.e. the pressure level does not exceed the predetermined pressure level and/or the duration of time depressed does not exceed the predetermined duration of time depressed), the processing unit 117a may monitor a predetermined countdown, such as fifteen seconds, such that the processing unit 117a may monitor the deactivation button 113. During this time, the haptic unit 117d may vibrate in response to a vibration signal from the processing unit 117a, such that the haptic unit 117d notifies the user of the accidental press. As such, the deactivation button 113 may prevent (i.e. stop) the communication unit 117b from sending the emergency signal to the external computing device 10.

Alternatively, the processing unit 117a may send the emergency signal via the communication unit 117b to the communication unit 14 of the external computing device 10 in response to receiving a predetermined consecutive depresses of the primary emergency button 112, such that 911 is dialed and/or predetermined number of people from the contact list. For example, the predetermined consecutive depresses of the primary emergency button 112 may include three consecutive depresses.

Additionally, the processing unit 117a may send the emergency signal via the communication unit 117b to the communication unit 14 of the external computing device 10 in response to expiration of the predetermined countdown, such that the at least one first responder (i.e. 911) is dialed and/or the predetermined number of people from the contact list.

Furthermore, the audio unit 114 may begin transmitting sound received therein using the communication unit 117b to the communication unit 14 of the external computing device 10. As such, the at least one first responder and/or the predetermined number of people from the contact list may hear the at least one sound within the vehicle 20. Accordingly, the at least one first responder and/or the predetermined number of people from the contact list may determine that the user is experiencing an emergency, such as being harassed and/or attacked by a passenger.

Although, the audio unit 114 may begin transmission of sound, the audio unit 114 may prevent sound being emitted therefrom. In other words, the audio unit 114 may keep the emergency call discreet to prevent the passenger and/or attacker within the vehicle 20 from becoming aware of the emergency call.

The audio unit 114 may emit sound therefrom in response to the intercom switch 115 being moved to on. Therefore, the user may engage in conversation with the at least one first responder and/or the predetermined number of people from the contact list.

Subsequent to the conversation, the intercom switch 115 may be moved to off. Alternatively, the intercom switch 115 may retract to off automatically via a springing motion in response to completion of the emergency call.

Furthermore, the intercom switch 115 may be used in other situations, such as a non-emergency situation. In other words, prior to the primary emergency button 112 and/or the secondary emergency button 122 being depressed, the input unit 11 of the external computing device 10 may activate in response to moving the intercom switch 115 to on. As such, movement of the intercom switch 115 during the non-emergency situation may automatically begin a video and/or audio recording within the vehicle 20 without the emergency signal. Accordingly, the intercom switch 115 may be moved to off to stop recording of the video and/or the audio.

The processing unit 123a may transmit the emergency signal via the communication unit 123b to the communication unit 14 of the external computing device 10 in response to the secondary emergency button 122 being depressed, such that the at least one first responder is dialed and/or the predetermined number of people from the contact list.

As such, the secondary emergency button 122 may be a backup plan and/or an alternative to the primary emergency button 112 due to being disposed in an area of a foot of the user.

The attacker deterrent unit 130 may include another audio unit that emits a high-pitched buzzing sound. The attacker deterrent unit 130 may be removably disposed on at least a portion of the vehicle 20, such as a rear passenger area of the vehicle.

Moreover, the attacker deterrent unit 130 may emit the high-pitched buzzing sound at variable frequency and variable signal-to-noise ratio, such that a decibel (dB) level may be adjusted. More specifically, the input unit 11 of the external computing device may use the app to adjust settings of the attacker deterrent unit 130 corresponding to a frequency level and a signal-to-noise ratio level based on a predetermined frequency level (e.g., at least 8 kHz) and/or a predetermined signal-to-noise ratio level (e.g., 100 dB) intolerable to people (i.e. damage hearing, sound that causes people to disburse or leave an area). In other words, the attacker deterrent unit 130 may prevent an attacker within the vehicle 20 from attacking the user. The attacker deterrent unit 130 may emit the high-pitched buzzing sound in response to the primary emergency button 112 and/or the second emergency button 122 being depressed simultaneously. Also, the attacker deterrent unit 130 is a separate and/or independent unit from a car radio and/or the audio unit 114.

Figure 4:
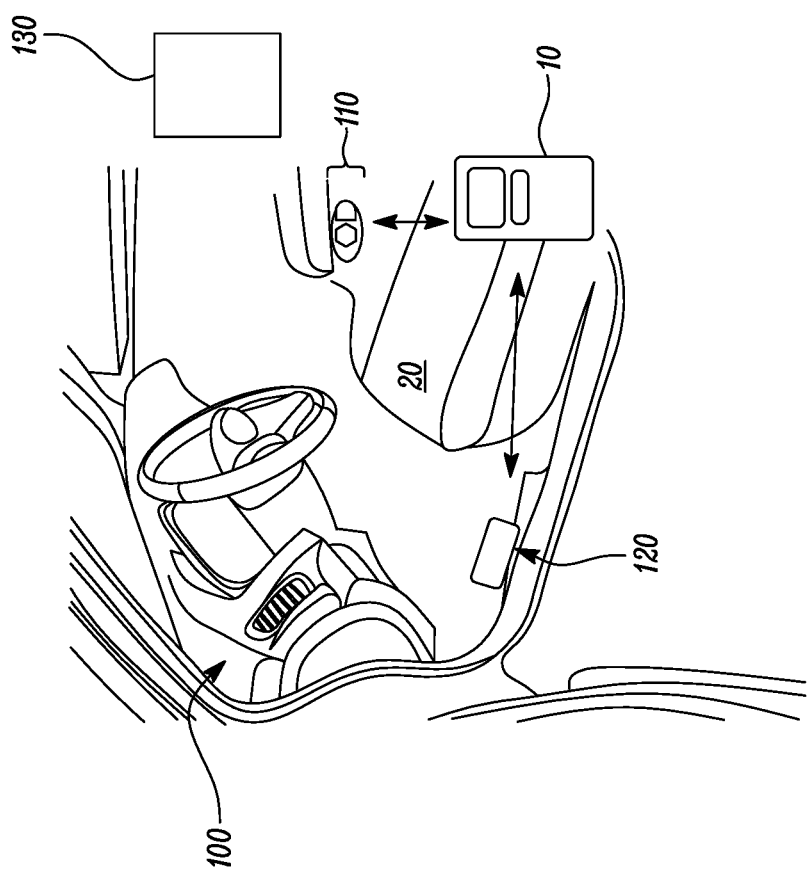
FIG. 4 illustrates a perspective view of the system to alert a third party during an emergency as disposed in the vehicle, according to an exemplary embodiment of the present general inventive concept.

FIG. 4 illustrates a perspective view of the system 100 to alert a third party during an emergency as disposed in the vehicle 20, according to an exemplary embodiment of the present general inventive concept.

Referring to FIG. 4, the body 111 may be removably disposed on at least a portion of the vehicle 20. For example, the body 111 may be removably disposed on at least a portion of an armrest of the vehicle 20.

Therefore, the system 100 may alert the at least one third party for the user in event of the emergency, such as attack by the passenger. As such the system 100 may help prevent injury and/or provide means to record the attack to substantiate a claim of injury by the user.

The present general inventive concept may include a system 100 connected to an external computing device 10 running a program thereon alert a third party during an emergency, the system 100 including a discreet notification device 110 removably disposed on at least a portion of a steering wheel of a vehicle 20 running the program thereon, the discreet notification device 110 including a body 111, a primary emergency button 112 disposed on at least a portion of the body 111 to transmit an emergency signal to the external computing device 10 to make an emergency call based on determination of at least one of an intentional press and an accidental press of the primary emergency button 112, and a deactivation button 113 disposed on at least a portion of the body 111, and a foot notification device 120 disposed on at least a portion of a floor of the vehicle 20 running the program thereon, the foot notification device 120 including another body 121, and a secondary emergency button 122 removably disposed on at least a portion of the another body 121 to transmit the emergency signal to the external computing device 10 to make the emergency call to at least one third party in response to depressing the secondary emergency button 122.

The discreet notification device 110 may further include an audio unit 114 disposed on at least a portion of the body 111 to receive at least one sound input therein, and emit at least one other sound therefrom, and an intercom switch 115 springingly disposed on at least a portion of the body 111 to allow sound to be emitted from the audio unit 114 in response to moving to on in a first position, and preventing sound from being emitted from the audio unit 114 in response to moving to off in a second position.

The discreet notification device 110 may further include a pressure sensor 116 disposed within at least a portion of the body 111 to detect at least one of a pressure level and a duration of time depressed on the primary emergency button 112.

The discreet notification device 110 may further include a control unit 117 disposed within at least a portion of the body 111 to compare the pressure level to a predetermined pressure level and the duration of time depressed to a predetermined duration of time depressed.

The control unit 117 may confirm the intentional press and transmits the emergency signal using the program to the external computing device 10 to make the emergency call to the at least one third party in response to determining the pressure level exceeding the predetermined pressure level and the duration of time depressed exceeds the predetermined duration of time depressed on the primary emergency button 112.

The control unit 117 may confirm the accidental press and monitors a predetermined countdown.

The control unit 117 may vibrate during the predetermined countdown.

The control unit 117 may prevent transmission of the emergency signal in response to depression of the deactivation button 113.

The control unit 117 may transmit the emergency signal in response to receiving predetermined consecutive depresses of the primary emergency button 112.

The control unit 117 may transmit the emergency signal in response to expiration of the predetermined countdown.

The intercom switch 115 may automatically move to off after the emergency call has completed.

At least one of the discreet notification device 110 and the foot notification device 120 may use the program to determine the at least one third party is at least one of at least one first responder and a predetermined number of people from a contact list.

At least one of the discreet notification device 110 and the foot notification device 120 may use the program to determine the predetermined number of people from the contact list are ranked by priority.

At least one of the discreet notification device 110 and the foot notification device 120 may use the program to perform at least one of silence at least one incoming call and transfer the at least one incoming call to voicemail.

At least one of the discreet notification device 110 and the foot notification device 120 may use the program to provide a geographical location to the external computing device 10.

The discreet notification device 110 may receive at least one vocal input for the program to use a code phrase to transmit the emergency signal to the external computing device 10 to make the emergency call.

The system 100 may further include an attacker deterrent unit 130 removably disposed on at least a portion of a rear passenger area of the vehicle 20 to emit a high-pitched buzzing sound in response to depressing the primary emergency button 112 and the secondary emergency button 113, such that the high-pitched buzzing sound has a frequency level and a signal-to-noise ratio level intolerable to people.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A system connected to an external computing device running logically arithmetic computer instructions thereon alert a third party during an emergency, the system comprising:
a discreet notification device removably disposed on at least a portion of a steering wheel of a vehicle running the logically arithmetic computer instructions thereon, the discreet notification device comprising:
a body,
a primary emergency button disposed on at least a portion of the body to transmit an emergency signal to the external computing device to make an emergency call based on determination of an intentional press, and
a deactivation button disposed on at least a portion of the body; and
a foot notification device disposed on at least a portion of a floor of the vehicle running the logically arithmetic computer instructions thereon, the foot notification device comprising:
another body, and
a secondary emergency button removably disposed on at least a portion of the another body to transmit the emergency signal to the external computing device to make the emergency call to at least one third party in response to depressing the secondary emergency button; wherein the discreet notification device further comprises: an audio unit disposed on at least a portion of the body to receive at least one sound input therein, and emit at least one other sound therefrom; and an intercom switch springingly disposed on at least a portion of the body to allow sound to be emitted from the audio unit in response to moving to on in a first position, and preventing sound from being emitted from the audio unit in response to moving to off in a second position.

2. The system of claim 1, wherein the discreet notification device further comprises: a pressure sensor disposed within at least a portion of the body to detect at least one of a pressure level and a duration of time depressed on the primary emergency button.

3. The system of claim 2, wherein the discreet notification device further comprises: a control unit disposed within at least a portion of the body to compare the pressure level to a predetermined pressure level and the duration of time depressed to a predetermined duration of time depressed.

4. The system of claim 3, wherein the control unit confirms the intentional press and transmits the emergency signal using the logically arithmetic computer instructions to the external computing device to make the emergency call to the at least one third party in response to determining the pressure level exceeding the predetermined pressure level and the duration of time depressed exceeds the predetermined duration of time depressed on the primary emergency button.

5. The system of claim 3, wherein the control unit confirms an accidental press and monitors a predetermined countdown.

6. The system of claim 5, wherein the control unit vibrates during the predetermined countdown.

7. The system of claim 5, wherein the control unit prevents transmission of the emergency signal in response to depression of the deactivation button.

8. The system of claim 5, wherein the control unit transmits the emergency signal in response to receiving predetermined consecutive depresses of the primary emergency button.

9. The system of claim 5, wherein the control unit transmits the emergency signal in response to expiration of the predetermined countdown.

10. The system of claim 1, wherein the intercom switch automatically moves to off after the emergency call has completed.

11. The system of claim 1, wherein at least one of the discreet notification device and the foot notification device uses the logically arithmetic computer instructions to determine the at least one third party is at least one of at least one first responder and a predetermined number of people from a contact list.

12. The system of claim 11, wherein at least one of the discreet notification device and the foot notification device uses the logically arithmetic computer instructions to determine the predetermined number of people from the contact list are ranked by priority.

13. The system of claim 1, wherein at least one of the discreet notification device and the foot notification device uses the logically arithmetic computer instructions to perform at least one of silence at least one incoming call and transfer the at least one incoming call to voicemail.

14. The system of claim 1, wherein at least one of the discreet notification device and the foot notification device uses the logically arithmetic computer instructions to provide a geographical location to the external computing device.

15. The system of claim 1, wherein the discreet notification device receives at least one vocal input for the logically arithmetic computer instructions to use a code phrase to transmit the emergency signal to the external computing device to make the emergency call.

16. The system of claim 1, further comprising: an attacker deterrent unit removably disposed on at least a portion of a rear passenger area of the vehicle to emit a high-pitched buzzing sound in response to depressing the primary emergency button and the secondary emergency button, such that the high-pitched buzzing sound has a frequency level and a signal-to-noise ratio level intolerable to people.

* * * * *